(12) United States Patent
Hasselbring

(10) Patent No.: US 7,934,652 B2
(45) Date of Patent: May 3, 2011

(54) SYSTEMS AND METHODS FOR A LIGHTWEIGHT NORTH-FINDER

(75) Inventor: Alan J. Hasselbring, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 593 days.

(21) Appl. No.: 12/119,285

(22) Filed: May 12, 2008

(65) Prior Publication Data

US 2010/0294836 A1 Nov. 25, 2010

(51) Int. Cl.
*G06F 19/00* (2011.01)
(52) U.S. Cl. ...................................................... 235/404
(58) Field of Classification Search .................. 235/400, 235/404; 89/37.01, 37.05; 33/318
See application file for complete search history.

(56) References Cited

U.S. PATENT DOCUMENTS

| | | | |
|---|---|---|---|
| 4,365,149 A * | 12/1982 | Falbel ........................... | 235/404 |
| 4,548,122 A * | 10/1985 | Hansson et al. ............. | 89/37.05 |
| 5,369,889 A | 12/1994 | Callaghan et al. | |
| 6,738,714 B2 | 5/2004 | McCall et al. | |
| 6,833,804 B2 * | 12/2004 | Atar ................................ | 342/10 |
| 6,966,120 B2 * | 11/2005 | Lysen ............................ | 33/412 |
| 2007/0095124 A1 | 5/2007 | Naroditsky | |

* cited by examiner

*Primary Examiner* — Seung H Lee
(74) *Attorney, Agent, or Firm* — Fogg & Powers LLC

(57) ABSTRACT

Systems and methods for a lightweight north-finder. A method of using a north-finder includes a tube configured to fire munitions secured to a base in preparation of firing operations. A north-finder coupled to a tube in order to determine an azimuth and elevation. The north-finder is rotated ninety degrees about an axis parallel to the tube in order to confirm the determined azimuth and elevation. The determined azimuth and elevation is displayed to a user. A system of using a north-finder includes a tube configured to fire munitions secured to a base. A north-finder mount coupled to the tube having a north-finder is configured to determine an azimuth and elevation. The north-finder includes a ring laser gyro, an accelerometer, and an inertial measurement unit, wherein, when the north-finder is rotated ninety degrees about an axis parallel to the tube, azimuth and elevation values are confirmed.

20 Claims, 6 Drawing Sheets

SYSTEMS AND METHODS FOR A LIGHTWEIGHT NORTH-FINDER

BACKGROUND OF THE INVENTION

A mortar is a muzzle-loading indirect fire weapon that fires shells at low velocities, short ranges, and high-arcing ballistic trajectories. A mortar is relatively simple and easy to operate. A modern mortar consists of a tube which gunners drop a shell into. A firing pin at the base of the tube detonates the propellant and fires the shell. These attributes contrast with the mortar's larger siblings, howitzers and field guns, which fire at higher velocities, longer ranges, flatter arcs, and sometimes, direct fire.

In order to fire the mortar, a firing solution is required having information such as temperature, type of rounds, type of tube, azimuth and elevation. In order to determine azimuth and elevation as well as current position, many methods have been used such as survey teams, using a magnetic compass, and sometimes even just an educated guess. Inaccurate and time consuming methods of firing leads to less combat power in a needed area and ultimately deaths of soldiers. A blast area of a mortar can be up to 50 m and injuries can happen outside that range. Accuracy and timeliness are imperative to the proper use of mortars.

Currently, there exists directional systems like MAPS® and TALIN® produced by Honeywell®. Items like the TALIN® can weigh twenty pounds or more and are not easily coupled to a mortar tube. The TALIN® requires three accelerometers and three ring laser gyros, which leads to a solution that becomes cost prohibitive. Another solution is to use a global positioning system which can be specially configured to output azimuth, but is not as accurate and requires connection to satellites which can be spoofed or jammed. Therefore there exists a need for a small lightweight man portable north-finder for use in accurately firing mortar rounds.

SUMMARY OF THE INVENTION

Systems and methods for a lightweight north-finder are disclosed herein. A method of using a north-finder includes a tube configured to fire munitions secured to a base in preparation of firing operations. A north-finder coupled to a tube in order to determine an azimuth and elevation. The north-finder is rotated ninety degrees about an axis parallel to the tube in order to confirm the determined azimuth and elevation. The determined azimuth and elevation is displayed to a user. A system of using a north-finder includes a tube configured to fire munitions secured to a base. A north-finder mount coupled to the tube having a north-finder is configured to determine an azimuth and elevation. The north-finder includes a ring laser gyro, a navigation-grade accelerometer, and a lower accuracy, 3-axis inertial measurement unit, wherein, when the north-finder is rotated ninety degrees about an axis parallel to the tube, azimuth and elevation values are confirmed.

Present state of the art gyro-compassing systems use one of two methods to determine azimuth: the first, Full-up Inertial Navigation Systems (INS's) utilize three orthogonal navigation-grade gyros (two in the level axis and one in the vertical axis) to sense earth's rotation and thereby determine the direction of North; the second, traditional north-finders utilize a single navigation-grade gyro, a motorized gimbal, and precise angular read-outs. The motor is used to incrementally rotate the gyro (inside the North-finder box) until the gyro senses zero rate (which indicates that the gyro is pointing East). The system then uses the angular readout signal to determine the system's orientation relative to the slewed gyro (which indicates that system's orientation relative to the earth's rotation axis (North).

BRIEF DESCRIPTION OF THE DRAWINGS

The preferred and alternative embodiments of the present invention are described in detail below with reference to the following drawings:

FIGS. 5-1-5-3 show a view orthogonal to a longitudinal axis of a mortar tube of a north-finder device mounted on the tube; and FIGS. 6-1-6-2 show a system for using a north-finder in an alternate embodiment.

DETAILED DESCRIPTION OF THE PREFERRED EMBODIMENT

Systems and methods for a lightweight north-finder are disclosed herein. In one embodiment a north-finder is used to determine an azimuth and elevation of a direct or indirect fire weapon that requires precision in order to ensure the munitions are fired into the correct area. The lightweight north-finder may be used for a plurality of weapons systems, but in this application, a mortar tube will be used as an example. However, this application should not be limited to a mortar tube as it could be used with a howitzer, a tank, or any other indirect or direct fire weapon system.

The north-finder as described herein advantageously uses a navigation grade gyro, a tactical-grade IMU and a manual, 90-degree indexing mechanism. This example configuration reduces size and cost, increases durability and reliability, and the tactical-grade IMU allows the system to track attitude and azimuth changes when the unit is moved. By way of example, a gyro reading is made at a first of two indexer positions After a minute or two the operator rotates the indexer 90 degrees to the other setting. Based on the rotations rates recorded at each of those two settings (by the navigation-grade gyro), the system's computer determines the azimuth of the unit relative to the Earth's true North pole. In an alternate embodiment, the rate sensed is also compared to the acceleration changes detected by a cross-axis navigation-grade accelerometer to account for any "real" angular motion (such as one side of the mortar slowly sinking into the soil).

Figure 1:
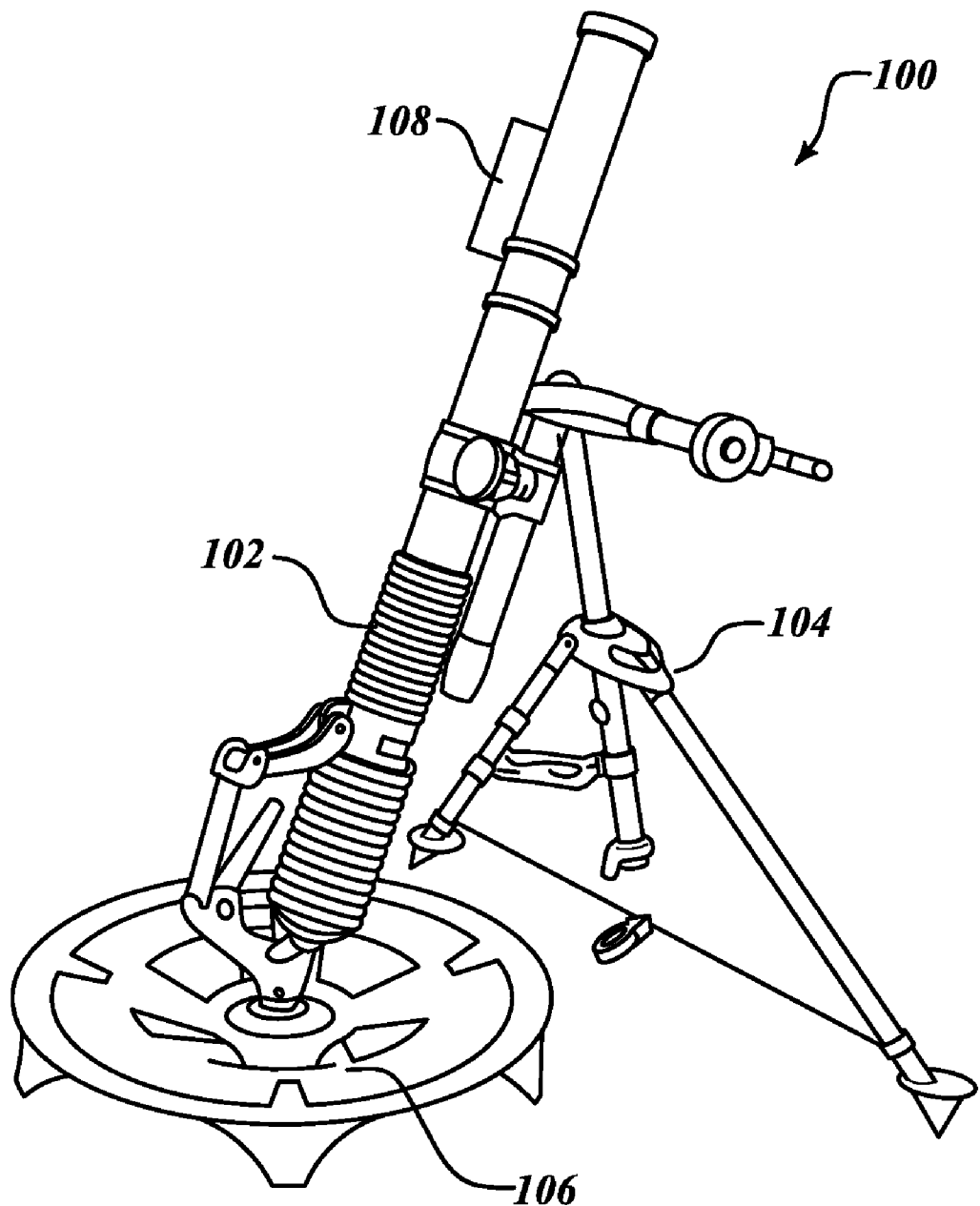
FIG. 1 shows a mortar system having a lightweight north-finder device mounted on a mortar tube in one embodiment.

FIG. 1 shows a system 100 having a lightweight north-finder 108 mounted on a mortar tube 102 in one embodiment. The system 100 includes a mortar tube 102 used to fire mortars in a combat setting. The mortar tube 102 is mounted on a dovetail mount 104 and a base 106. The dovetail mount 104 works to align the tube 102 as well as support the tube 102 when a mortar round is fired. For example when the mortar tube 102 fires the tube 102 moves, every time the tube 102 moves the mortar needs to be re-targeted before it fires and the mount 104 works to minimize this movement. The lightweight north-finder 108 is coupled to the mortar tube 102, such that the north-finder 108 displays an azimuth and elevation of the tube 102 such that a user can determine a firing solution.

Figure 3:
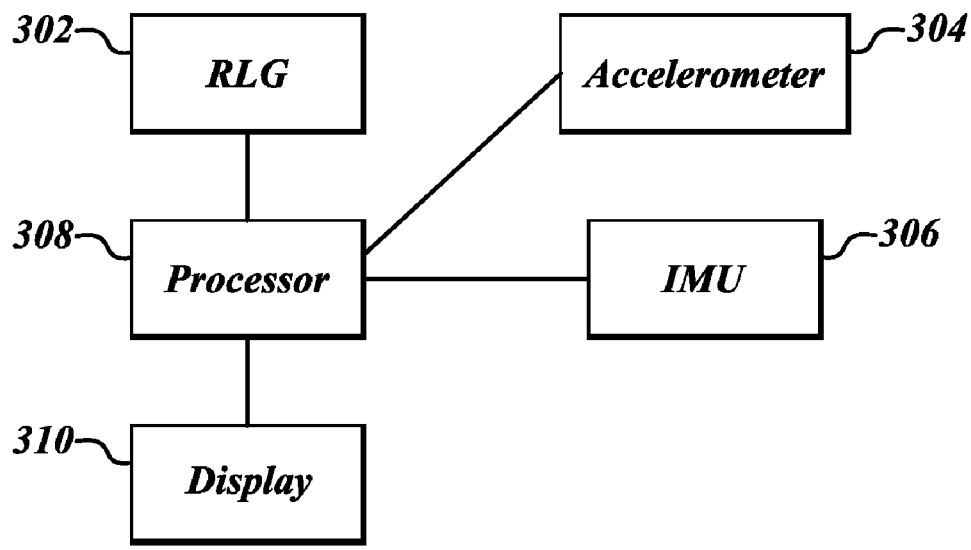
FIG. 3 shows an internal diagram of a north-finder device.
Figure 4:
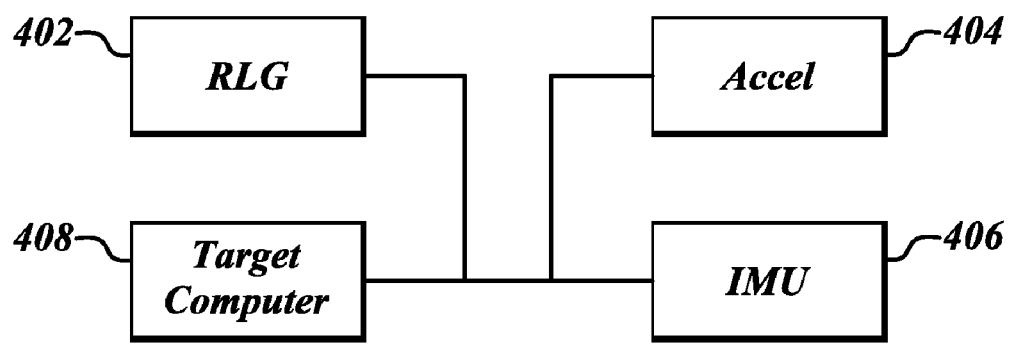
FIG. 4 shows an example north-finder device in one embodiment.

FIG. 3 shows a schematic diagram of an example north-finder. The north-finder contains a digital ring laser gyro 302 such as the GG1320 produced by Honeywell®, an accelerometer 304 such as the QA-2000 produced by Honeywell®, an inertial measurement unit ("IMU") 306 such as the HG1930 tactical grade MEMS-based IMU produced by Honeywell®, a processor 308 and a display 310. The ring laser gyro 302 and the accelerometer 304 act to determine azimuth using gyro-compassing and sends the processor 308 current rate of acceleration and changes in rotational attributes therefore resulting in a current azimuth and elevation of the system. The IMU 306 tracks attitude and heading while the device is in use and sends those signals to the processor 308. The processor 308 determines attitude and heading information based on the outputs of the gyro 302 and the accelerometer 304, the processor calculates the differences in readings between the first position of the north-finder and the second position after a ninety degree rotation. Then the processor 308 outputs attitude and heading information to a display 310, which allows the user to see an azimuth and elevation. The user may also see information related to the hemisphere, latitude, whether the device is aligned or searching and whether the unit is functioning correctly.

In an alternate embodiment the display 310 is optional, because the processor outputs azimuth and elevation information to a targeting computer 312 that works to determine a firing solution and aligns the tube to hit a specific point therefore making it not necessary to show a user azimuth and elevation information. In an alternate embodiment the device may also include a motor and a gimbal to execute the 90 degree rotation.

Figure 2:
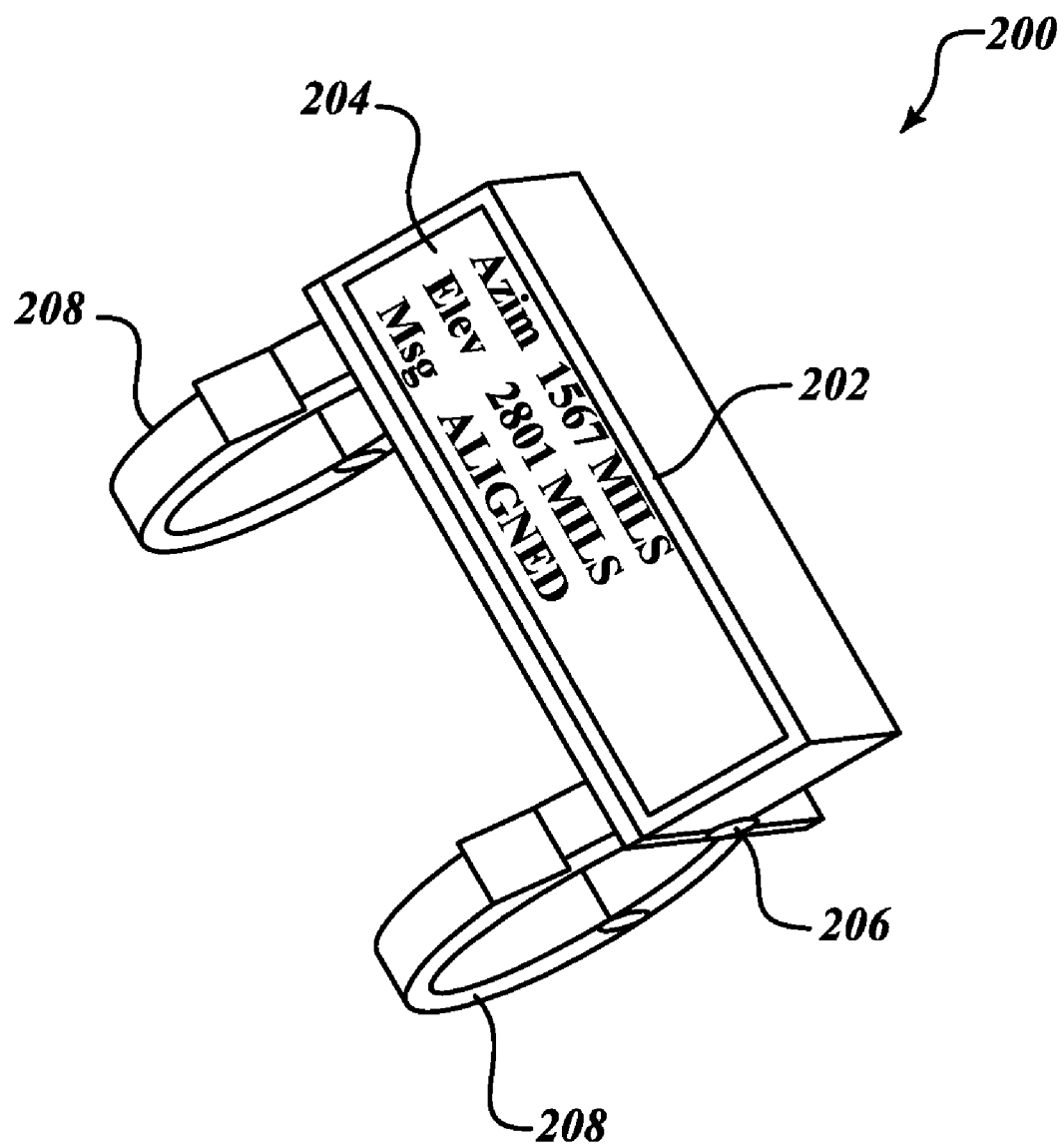
FIG. 2 is a perspective view of a north-finder device formed in accordance with the present invention.

FIG. 2 shows an example north-finder system 200 in one embodiment. The north-finder system 200 is configured to determine an azimuth and elevation while coupled to a mortar tube (not shown). The north-finder system 200 contains a north-finder housing 202, having a display 204. The display 204 typically outputs azimuth information, elevation information and messages. The north-finder 202 mounted on a rotating hinge 206 that is configured to allow the north-finder 202 to rotate ninety degrees. The rotating hinge 206 is generally parallel to the tube or nominally parallel to vertical. The north-finder system 200 has mounting brackets 208 for securing the device to a tube.

Figures 1, 5:
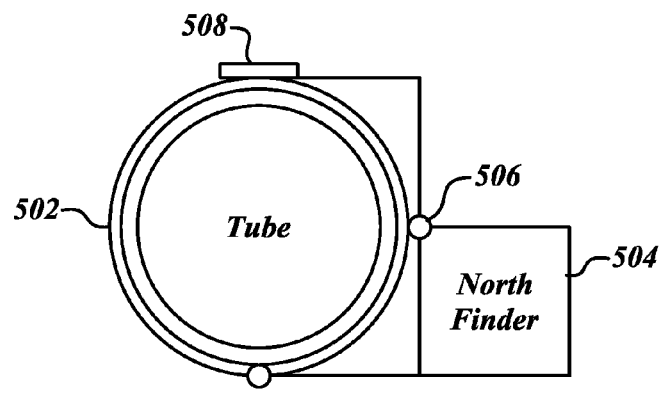
Figures 2, 5:
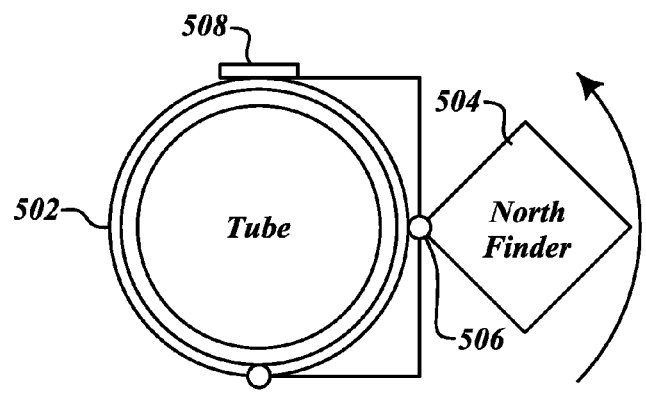
Figures 3, 5:
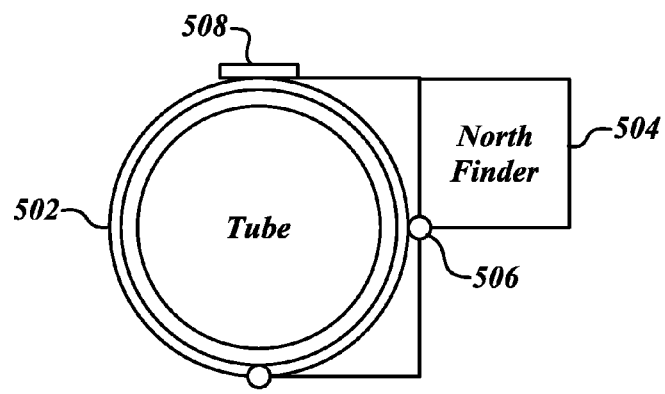

FIGS. 5-1-5-3 show a view orthogonal to a longitudinal axis of a mortar tube 502 of a north-finder device 504 mounted on the tube 502. The north-finder 504 is mounted on the tube 502 and is rotatable around a hinge 506. The hinge 506 is generally parallel to the tube 502. The north-finder 504 is secured to the tube 502 using a latch 508. FIG. 5-1 shows the north-finder 504 in a first position, the north-finder device 504 stays in its current position until aligned, which occurs when the device determines location information. When aligned the north-finder 504 is rotated about the hinge 506 as shown in FIG. 5-2, such that the north-finder is rotated a total of 90 degrees as shown in FIG. 5-3. Once rotated 90 degrees the north-finder 504 aligns in the second position giving a second reading. Advantageously, the result is a more accurate lightweight system for determining azimuth and elevation.

Figures 1, 6:
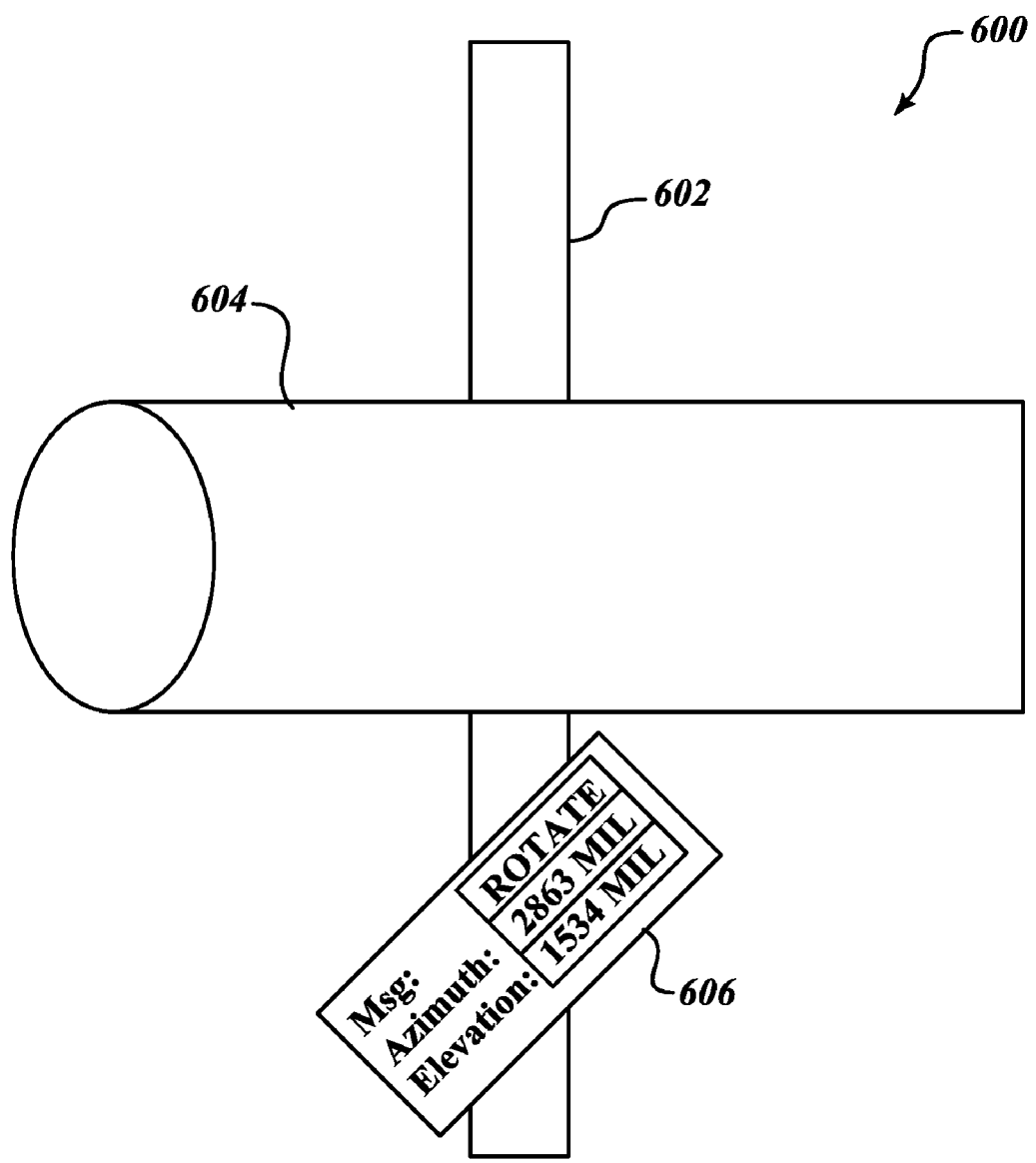
Figures 2, 6:
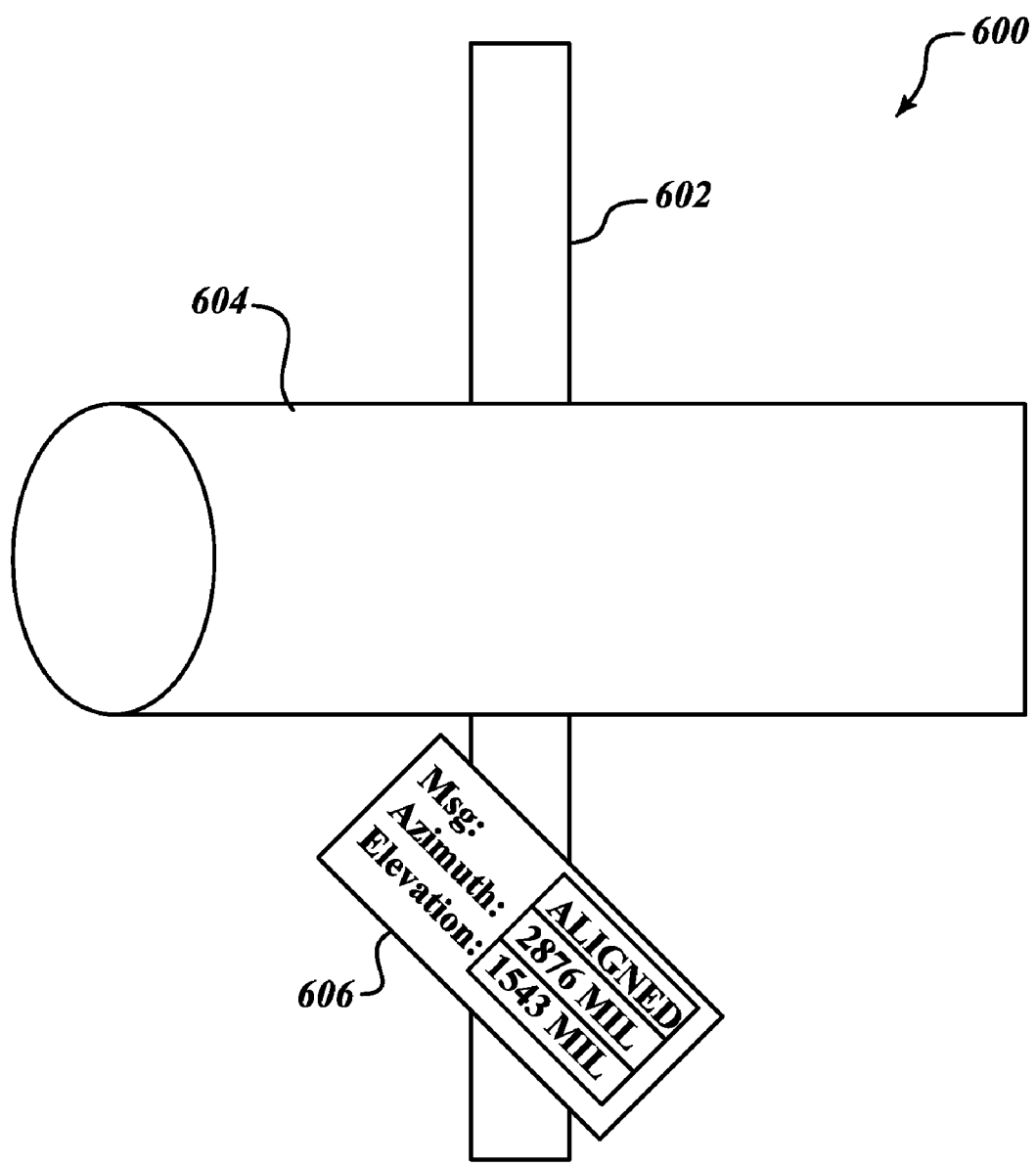

FIGS. 6-1-6-2 show a system 600 for using a north-finder 606 in an alternate embodiment. The mortar tube 604 is mounted on a dovetail mount 602. Instead of on the tube 604, the north-finder 606 is mounted on the dovetail mount 602 and provides azimuth and elevation information to a user. In this alternate embodiment the north-finder 606 starts in a first position in FIG. 6-1 and is rotated ninety degrees around a vertical axis to a second position shown in FIG. 6-2.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privelage is claimed are defined as follows:

1. A method of using a north-finder comprising:
   determining an azimuth and elevation using a direction finder located in a first position relative to the firing tube;
   rotating the north-finder ninety degrees about an axis parallel to the tube into a second position;
   determining an azimuth and elevation using a direction finder located in the second position relative to the firing tube;
   generating an azimuth and elevation based the azimuth and elevation determined in the first and second position; and
   outputting the generated azimuth and elevation to a user.

2. The method of claim 1, further comprising confirming determined azimuth and elevation after the tube is fired.

3. The method of claim 2, wherein the azimuth is determined using an inertial measurement unit.

4. The method of claim 1, further comprising computing a determined azimuth and elevation using a processor after taking readings from the first position and the second position.

5. The method of claim 1, further comprising determining an azimuth using gyro-compassing using a digital ring laser gyroscope and an accelerometer in the north- finder.

6. The method of claim 1, wherein the display shows a user at least one of rotate, align, and not aligned.

7. The method of claim 1, wherein the tube is a mortar tube.

8. A system of using a north-finder comprising:
   a tube configured to fire munitions secured to a base in preparation of firing munitions;
   a north-finder mount coupled to the tube; and
   a north-finder coupled to the north-finder mount and configured to determine an azimuth and elevation further comprising:
      a ring laser gyro;
      an accelerometer;
      an inertial measurement unit; and
      a processor configured to gather data from and in communication with the ring laser gyro, the accelerometer, and the inertial measurement unit and to output an azimuth and elevation and to confirm the azimuth and elevation,
   wherein when the north-finder is rotated ninety degrees about an axis parallel to the tube an azimuth and elevation is confirmed.

9. The system of claim 8, wherein the north finder further comprises a display configured to show a user at least one of the azimuth and elevation information.

10. The system of claim 9, wherein the display shows a user at least one of rotate, align, and not aligned.

11. The system of claim 8, wherein the north-finder mount further comprises a hinge coupled to the north-finder to enable ninety degree rotation of the north finder.

12. The system of claim 8, wherein the processor is configured to output azimuth and elevation information to a targeting computer.

13. The system of claim 8, wherein the tube is a mortar tube.

14. A system for a lightweight device to determine an azimuth and elevation comprising:
   a ring laser gyro;
   an accelerometer;

an inertial measurement unit; and a processor configured to gather data from and in communication with the ring laser gyro, the accelerometer, and the inertial measurement unit and to output an azimuth and elevation and to confirm the azimuth and elevation;

wherein the north-finder is configured to take a first measurement at a first position and then rotate ninety degrees to a second position in order to take a second reading.

15. The system of claim 14 a display configured to display azimuth and elevation from the processor.

16. The system of claim 15, further comprising a north-finder configured to house the ring laser gyro, the accelerometer, the inertial measurement unit, and the processor.

17. The system of claim 16 wherein the north-finder is configured to attach to at least one of a munition firing tube and a mount for a munitions firing tube.

18. The system of claim 17 wherein the processor is configured to output azimuth and elevation information to a targeting computer.

19. The system of claim 18 wherein the display shows a user at least one of rotate, align, and not aligned.

20. The system of claim 19 wherein the tube is a mortar tube.

* * * * *